United States Patent [19]
Kaaden et al.

[11] Patent Number: 5,917,671
[45] Date of Patent: Jun. 29, 1999

[54] RECORDING METHOD AND INFORMATION MEDIUM FOR A PLURALITY OF LONGITUDINAL TRACK BUNDLES ENABLING TRACKING DURING RECORDING AND/OR PLAYBACK OF TRACK BUNDLES

[75] Inventors: Juergen Kaaden, Villingen; Andreas Kluger, Hanover; Martin Kuner, Donaueschingen; Peter Mahr, Königsfeld; Klaus Oldermann, Villingen-Schwenningen; Hartmut Peters, Barsinghausen; Gerhard Reiner, Villingen-Schwenningen; Werner Scholz, Gehrden; Friedrich Timmermann, Garbsen; Bernd Wessolly, Hemmingen, all of Germany

[73] Assignee: Deutsche Thomson-Brandt GmbH, Villingen-Schwenningen, Germany

[21] Appl. No.: 08/814,123

[22] Filed: Mar. 10, 1997

[51] Int. Cl.⁶ .................................................. G11B 5/584
[52] U.S. Cl. ...................................... 360/77.12; 360/78.02
[58] Field of Search ............................. 360/77.12, 78.02, 360/22, 77.08

[56] References Cited

U.S. PATENT DOCUMENTS

| | | | |
|---|---|---|---|
| 5,262,908 | 11/1993 | Iwamatsu et al. | 360/78.02 |
| 5,291,348 | 3/1994 | Copolillo | 360/77.12 |
| 5,418,670 | 5/1995 | McClure et al. | 360/77.12 |
| 5,483,394 | 1/1996 | Harman | 360/77.12 |
| 5,488,525 | 1/1996 | Adams et al. | 360/77.12 |
| 5,568,327 | 10/1996 | Pahr et al. | 360/77.12 |
| 5,600,506 | 2/1997 | Baum et al. | 360/77.08 |
| 5,675,448 | 10/1997 | Molstad et al. | 360/77.12 |

FOREIGN PATENT DOCUMENTS

| | | | |
|---|---|---|---|
| 0379324 | 7/1990 | European Pat. Off. | 360/77.12 |
| 0630000 | 12/1994 | European Pat. Off. | 360/77.12 |
| 2941013 | 4/1980 | Germany . | |
| 3517380 | 11/1986 | Germany . | |
| 5-46961 | 2/1993 | Japan | 360/77.12 |

OTHER PUBLICATIONS

Copy of Search Report.

*Primary Examiner*—Nabil Hindi
*Attorney, Agent, or Firm*—Oblon, Spivak, McClelland, Maier & Neustadt, P.C.

[57] ABSTRACT

The invention relates to a method for recording longitudinal track bundles on an information medium. The method involves recording tracking information in special tracks in said track bundles. The special tracks are contiguous between each other. When recording a new track bundle a recording and/or reading head may be positioned using tracking information contained in special tracks of a previously recorded track bundle. Several examples of patterns used for coding tracking information in the special tracks we described.

18 Claims, 3 Drawing Sheets

RECORDING METHOD AND INFORMATION MEDIUM FOR A PLURALITY OF LONGITUDINAL TRACK BUNDLES ENABLING TRACKING DURING RECORDING AND/OR PLAYBACK OF TRACK BUNDLES

BACKGROUND OF THE INVENTION

The invention relates to a recording method for multitrack recording devices. Such devices allow to record a plurality of longitudinal track bundles on an information medium. The invention further relates to an information medium which carries a plurality of longitudinal track bundles comprising special tracks with tracking information in them.

DISCUSSION OF THE BACKGROUND

FIG. 1 schematically illustrates how an information medium may be recorded in prior art. The multitrack recording is done on a magnetic tape 1 using a recording and/or reading head 2 (shown enlarged in comparison to the tape 1). A writing part of the head 2 comprises a matrix head 3 which allows to record a plurality of tracks (not shown) simultaneously, e.g. 80 parallel tracks in a longitudinal track bundle 4. Each track is recorded using an active part 5 of the matrix head 3. The recording of the tracks is done at a recording velocity between the matrix head 3 and the magnetic tape 1 which appears to be relatively slow. Current matrix head design allows for a spacing of the active parts 5 from one another which results in a track pitch of 7 micrometers between simultaneously recorded tracks. It is possible to record a plurality of track bundles 4 adjacent to each other on a tape 1 by coarse positioning the head 2 transversely i.e. across the tapewidth.

A reading of tracks on the tape 1 may be done using a reading part 6 of the head 2. A playback of information contained in the tracks requires the 80 tracks of a track bundle 4 to be read simultaneously. The reading part 6 comprises a magneto-optical transducer (not shown) which uses a Kerr-effect, and a CCD-array 7. During reading, a light beam is modulated depending on a magnetization of the single tracks and projected on the CCD-array 7.

The longitudinal track bundles 4 are parallel between each other. A longitudinal control track 8 located at a lower border 9 of tape 1 contains orientation information. The orientation information may for example be used to find a longitudinal position on tape 1. The orientation information could be a sequence of signals which are read and counted during recording and/or read-out of track bundles to determine a relative longitudinal position. The control track 8 may be read inductively using a dedicated magnetic control head (not shown).

A transverse coarse positioning of the matrix head 3 for the recording of each single track bundle 4 is done using a step motor (not shown) which activates the head 2. For reasons of error tolerances, distances D between the track bundles 4 must be relatively large, e.g. 112 micrometers.

One of the problems to which a solution is sought in the present invention is to find an information medium and/or a recording method which enables tracking during recording and playback of track bundles, i.e. a relatively precise transverse positioning of the head 2 in respect to a track bundle. Furthermore the medium and/or the method should enable a retrieval of orientation information from the tape during a fast search, i.e. when the head 2 and the tape 1 are moved relatively to each other with a search velocity greater than the recording and/or reading velocity.

SUMMARY OF THE INVENTION

A solution to the above mentioned problem is according to the present invention found in a method for recording longitudinal tracks on an information medium, said information medium being recorded and/or read using a recording and/or reading head, in which a plurality of track bundles each having an upper and a lower lateral border and comprising each between said upper and lower lateral borders a plurality of parallel longitudinal tracks are recorded parallel to each other, the method comprises a step of recording tracking information in special tracks in said track bundle, said special tracks being contiguous between each other.

A further solution to the above mentioned problem may according to the present invention be found in an information storage medium for carrying a plurality of longitudinal track bundles on a surface, each of said track bundles having an upper and a lower lateral border and comprising a plurality of adjacent parallel tracks, said track bundles being parallel to each other; each track bundle comprises special tracks containing tracking information, said special tracks being contiguous between each other The information contained in the control track may be transferred to the special tracks allowing to eliminate the control track and the dedicated magnetic control head. The special tracks additionally provide tracking information which may be used during recording and/or playback of the track bundles with the recording and/or reading head.

In a solution according to the invention a method for recording comprises a recording of four special tracks, of which two are inner tracks and two are outer tracks, the inner tracks being between the outer tracks, and representing the tracking information by attributing characteristics to respectively each of a plurality of surface areas in the outer and inner tracks, a first characteristic of which being attributed to a total surface area in the outer tracks, the first and a second characteristic of which being alternately attributed to surface areas which form a longitudinal sequence in each inner track, such that contiguous surface areas in both inner tracks have different characteristics.

In another solution according to the invention a method for recording comprises a recording of four special tracks, of which two are inner tracks and two are outer tracks, the inner tracks being between the outer tracks, and representing the tracking information by attributing characteristics to respectively each of a plurality of surface areas in the outer and inner tracks, a first and a second characteristic of which being alternately attributed to surface areas which form a longitudinal sequence in each inner and outer track such that surface areas in one inner track are contiguous to surface areas having a same characteristic in the other inner track and surface areas in an inner tracks are contiguous to surface areas having a different characteristic in an outer track.

BRIEF DESCRIPTION OF THE DRAWINGS

Other characteristics and advantages of the inventions will appear from the following description of several examples made with reference to the appended FIG. 1 to 4.

DESCRIPTION OF THE PREFERRED EMBODIMENTS

The examples and figures are given by way of illustration only, and thus are not limitative of the present invention. Same reference numbers will be used to refer to the same items throughout the FIG. 1 to 4.

It is known from prior art to use a tracking device to precisely position the head 2 in respect to a track bundle 4. The tracking device typically allows a more precise positioning than the step motor and is therefore used as a complement to the step motor. The tracking device is fed by a tracking signal which indicates a position of the head relative to a track in a direction typically perpendicular to the track. The tracking signal may be obtained in various ways.

Figure 1:
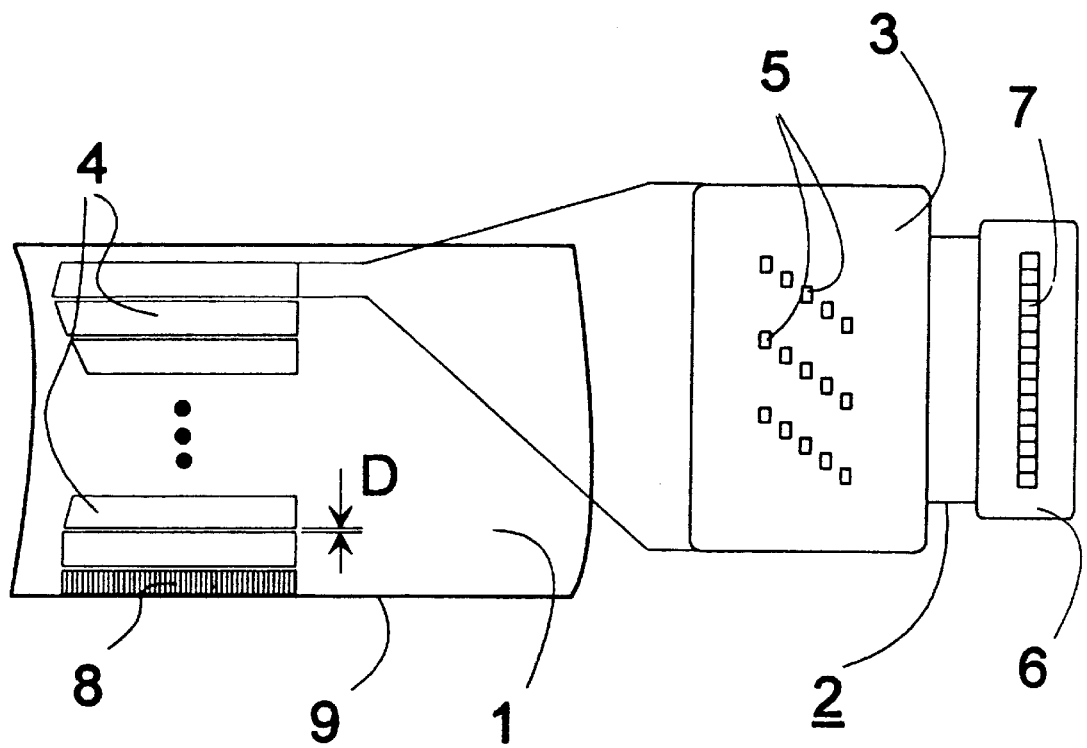
FIG. 1 contains a schematic representation of track bundles and a control track.
Figure 2:
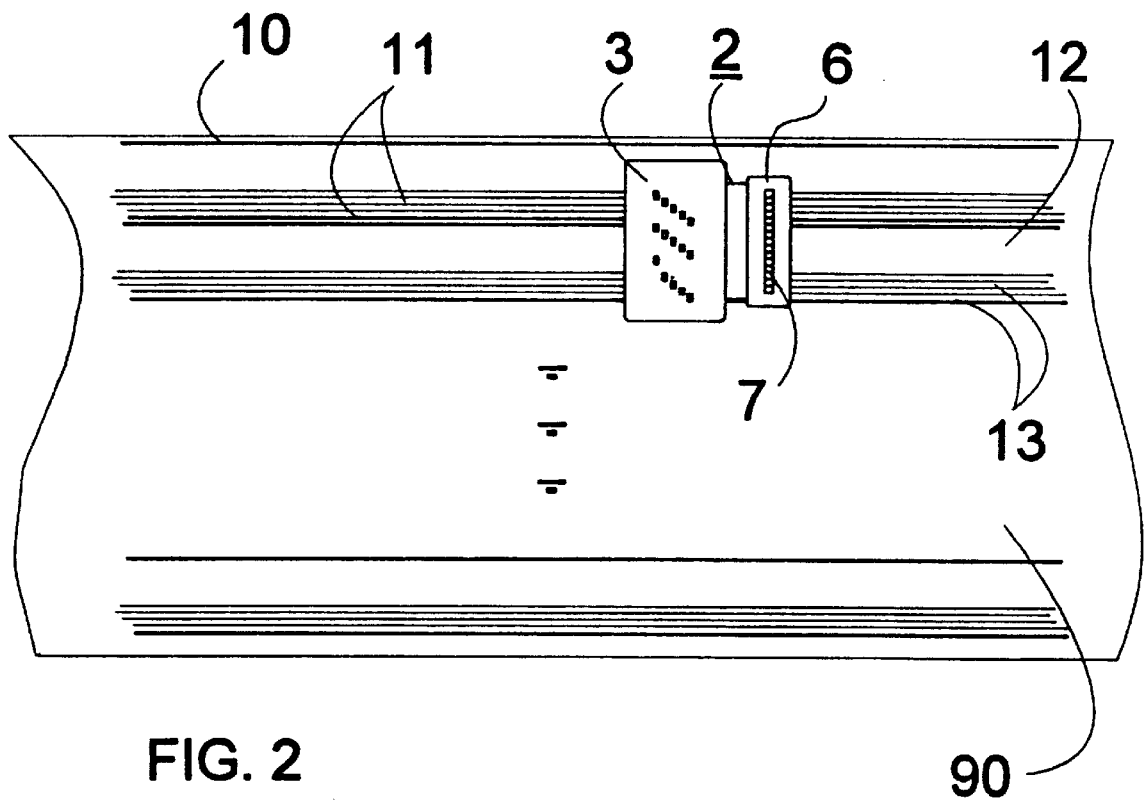
FIG. 2 contains a schematic representation of track bundles with special tracks.

Shown in FIG. 2 is an information medium 90 according to the invention in which a track bundle 10 comprises special tracks 11. The special track 11 contain tracking information (not shown). The tracking signal may be obtained after reading the special tracks 11 by evaluating the tracking information. A new track bundle 12 may be recorded by positioning the head 2 relatively to the previously recorded track bundle 10. In order to position the head 2 the special tracks 11 are read and the tracking information contained in them evaluated to feed the tracking device. The head 2 is positioned in a way such that the matrix head 3 will not overwrite the previously recorded track bundle 10 when recording the new track bundle 12. The method may be applied again to record another track bundle using special track 13 in the new track bundle 12. This way it is possible to record a plurality of track bundles over a width of the tape. The positioning of the matrix head 3 may be done with a relatively high precision resulting in minimal distances between the track bundles, i.e. smaller than in prior art. Thus the recording capacity of the information medium 9 may be increased.

The special tracks 11, 13 may be recorded substantially at a lateral border inside each track bundle 10, 12, e.g. at a lower lateral border. A head 2 having a reading part 6 with a CCD-array 7 only slightly wider than a track bundle may be used in order to overlap the new track bundle 12 and the special tracks 11 in the previously recorded track bundle 10. In the information medium 90 a control track like the control track 8 shown in FIG. 1 may be left out.

The special tracks 11, 13 may also be used for tracking during a reading of the track bundle 10, 12 in which they are respectively comprised. The tracking information contained in the special tracks is used in conjunction with the tracking device to keep the head 2 precisely positioned on the track bundle being read.

Figure 3:
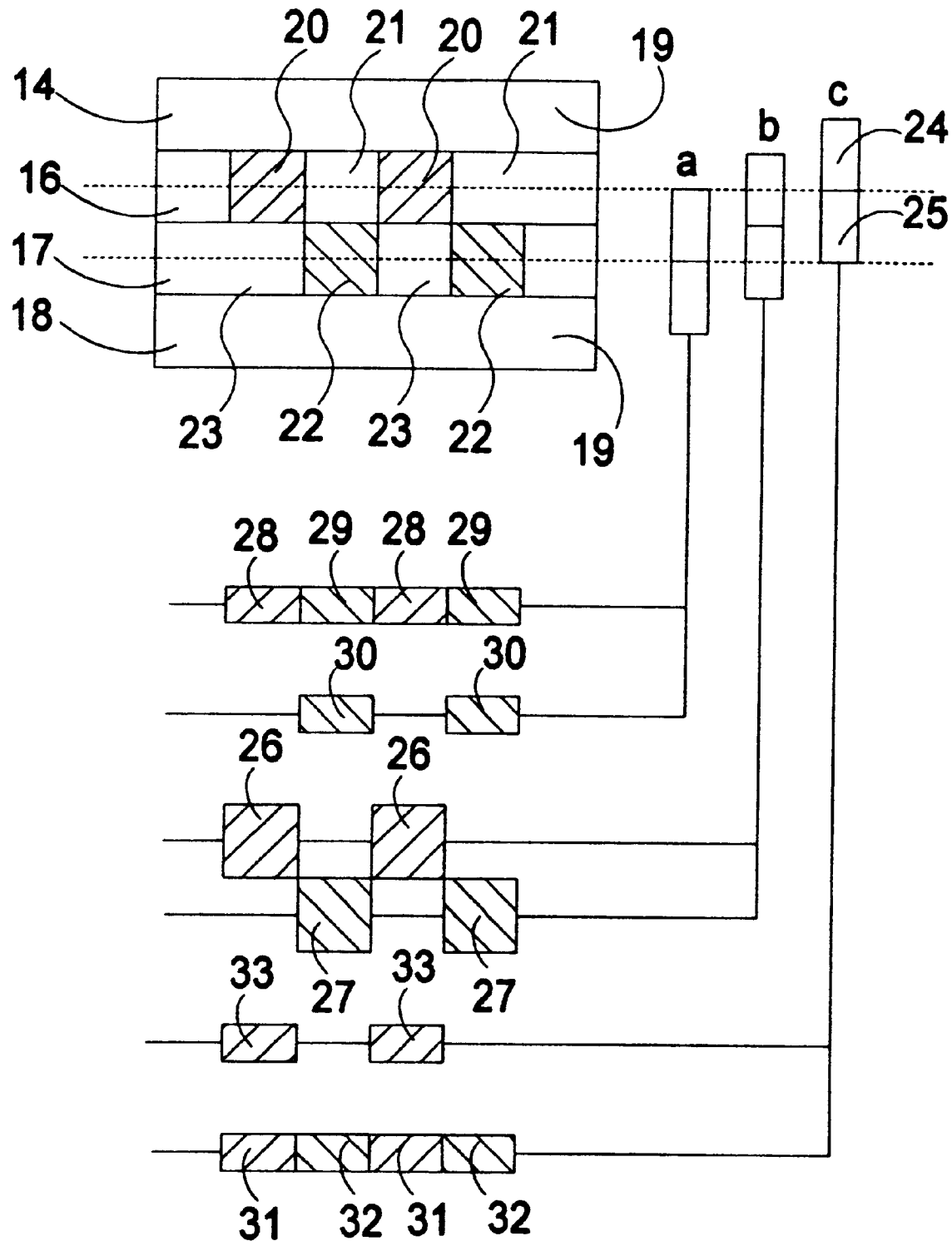
FIG. 3 contains a schematic representation of an example for special tracks.

FIG. 3 schematically shows a longitudinal part of four contiguous special tracks 14, 16, 17 and 18 which may be used in a track bundle according to the invention. The two inner special tracks 16 and 17 are located between the outer tracks 14 and 18. The special track 14, 16, 17 and 18 have surface areas 19 to 23 which present either one of two characteristics. A first characteristic is represented using a plain surface and a second characteristic using a hatched surface in FIG. 3. The first characteristic may for example be that the surface is erased i.e. not magnetized. The second characteristic may for example be that the surface is magnetized. The outer tracks 14 and 18 have total surface areas 19 presenting the first characteristic. Each inner track has inner surface areas 20 to 23 presenting the first characteristic (21, 23) or the second characteristic (20, 22). The inner surface areas form longitudinally alternating sequences e.g. 20, 21, 20 . . . or 22, 23, 22 . . . depending on the inner track. Surface areas 20 or 21 from one inner track are contiguous to surface areas 23 or 22 respectively which pent a different characteristic in the other inner track. The surface areas 19 to 23 form a pattern which is used to code tracking information.

The size of the surface areas 20 to 23 may be chosen to have a large size, e.g. a sufficient longitudinal extend which enables them to be read and evaluated at fast search velocity. This way the special tracks 14 to 18 contain information which is also readable during fast search.

During recording or playback, the tracking information may be obtained by simultaneously reading each inner track and evaluating reading signals obtained. Channels 24 and 25 of the reading part 6 (not shown) are schematically represented in different alignment positions a, b and c with the inner tracks 16 and 17. In the alignment position b the reading part 6 is positioned precisely on the inner tracks 16 and 17; reading signals 26 and 27 obtained from channels 24 and 25 respectively come from inner track 16 and 17 only and have a maximum level of amplitude. In the alignment position a the reading part 6 is offset towards the inner track 17. The reading signals 28 and 29 obtained from channel 24 alternately come from inner tracks 16 and 17 while the reading signals 30 obtained from channel 25 come from the inner track 17 only. In the alignment position c the reading part 6 is offset towards the inner track 16. The reading signals 31 and 32 obtained from channel 25 alternately come from inner tracks 16 and 17 while the reading signals 33 obtained from channel 24 come from the inner track 16 only.

The surface areas 22 in the inner track 17 may be replaced by surface areas presenting a third characteristic. The third characteristic may for example be a magnetization which is different from the magnetization of surface areas 20. This way it is more easy to distinguish whether a signal from either channel 24 or 25 comes from reading an inner track 16 or 17 since the reading signal will be a function of the surface area's characteristics.

Figure 4:
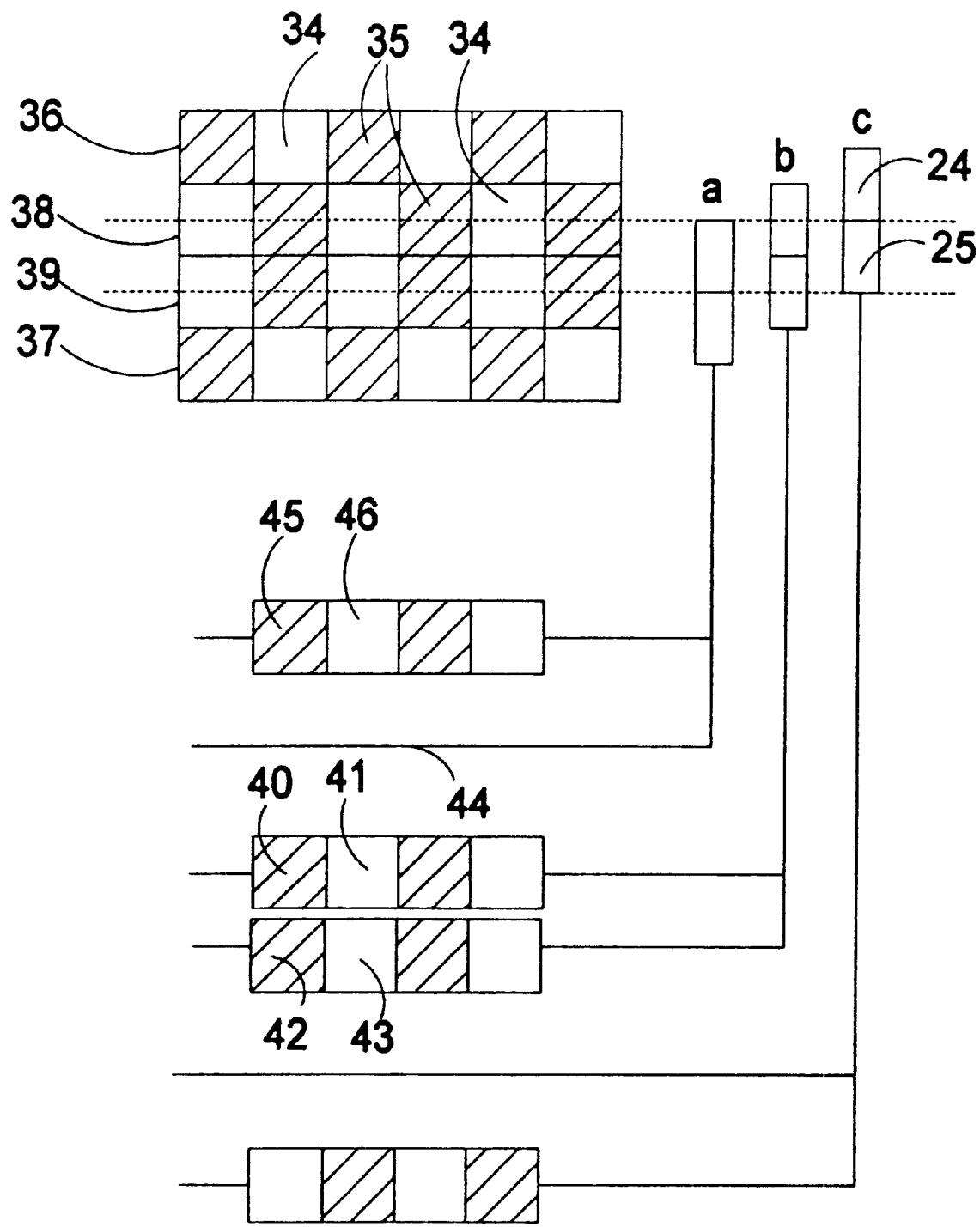
FIG. 4 contains a schematic representation of another example for special tracks.

FIG. 4 shows a schematic representation of a different pattern formed by surface areas 34 and 35 in four special tracks, i.e. outer track 36, 37 and inner track 38, 39. Surface areas 34 and 35 respectively present a first and a second characteristic. The first and the second characteristic may for example be magnetization of opposed signs but such that a signal obtained on reading a surface area presenting the first characteristic and a signal obtained on reading a surface area of a same size as the previous but presenting the second characteristic add up to a reading signal of value zero. Surface area in the each inner track 38 and 39 from a longitudinally alternating sequence of surface areas 34, 35, 34 . . . such that surface areas 34 in one inner track 38 are contiguous to surface areas 34 in the other inner track 39. The outer track 36 and 37 contain longitudinally alternating sequences of surface areas 34 and 35 such that surface areas 34 of the outer tracks 36 and 37 respectively are contiguous to surface areas 35 of the inner tracks 38 and 39.

Channels 24 and 25 of the reading part 6 (not shown) are schematically represented in different alignment positions a, b and c with the inner tracks 38 and 39.

In position b signals 40, 41 and 42, 43 are obtained from channels 24 and 25 which come from the inner tracks 38 and 39. The signals 40, 41 and 42, 43 may respectively be converted to a first and second DC-signal (not shown). The first an second DC-signals have a same amplitude. A tracking signal may be obtained by subtracting the first an the second DC-signal from each other, the tracking signal is zero in position b.

In the alignment position a the reading part 6 is offset towards the inner track 39. A reading signal 44 obtained from channel 25 comes from the inner track 39 and the outer track 37. The signals coming from track 39 and 37 are of opposed sign and add up to a reading signal 44 of value zero. Reading signals 45 and 46 obtained from channel 24 come from both inner tracks 38 and 39. In a same way as described above a first and a second DC-signal may be obtained from respectively the reading signals 45, 46 and the reading signal 44. The second DC-signal has an amplitude of value 0. A tracking signal obtained from subtracting the first and the second DC-signals from each other as a value with a determined sign.

In the alignment position c the reading part 6 is offset towards the inner track 38. Similarly as in alignment position a, a tracking signal with a value having a sign opposed to the determined sign may be obtained.

It is thus possible to obtain a tracking signal by evaluating reading signals from channels 24 and 25. The sign of the tracking signal gives an indication of a direction offset of the reading part 6 relative to the inner tracks 38 and 39.

The longitudinally alternating sequences of surface areas presenting the first and second characteristic or the first and third characteristic as described in the above examples of FIGS. 3 and 4 may for example correspond to a bi-phase code. This bi-phase code is free of DC-components (DC-free) and selfclocking; information contained in the special tracks may be obtained at various relative tape/head velocities.

An advantage of the pattern in the special tracks according to FIG. 4 is found in the fact that at an undefined alignment position of the reading part 6 relative to the special tracks, such as it may occur during fast search, at least one channel 24 or 25 will fully overlap surface areas 35 or 34 only of the two inner tracks 38 and 39 and accordingly will deliver a reading signal with a high level of amplitude. After having identified the concerned channel, an information which for example indicates a transversal position of the information medium relative to the reading part 6 may be obtained. Furthermore, through the identification of the channel specific channels of the reading part 6 may be attributed to specific tracks of a track bundle.

Apart from the tracking, the transversal and the longitudinal position information the process according to FIG. 4 may also deliver identification information perhaps contained in a surface area of the special tracks, allowing to identify a track bundle.

We claim:

1. A method for recording longitudinal tracks on an information medium, said information medium being recorded and/or read using a recording and/or reading head, comprising the step of:
   providing said information medium with a plurality of track bundles each of said bundles having an upper and a lower lateral border;
   providing said information medium with a plurality of parallel special longitudinal tracks which are recorded parallel to each other and wherein said plurality of special parallel longitudinal tracks are provided in each of said track bundles at one of said upper and said lower lateral borders and wherein a first of said plurality of special tracks of a first track bundles is contiguous with at least a second track bundles, with track bundle tracking information for any one track bundle being located in the plurality of parallel special longitudinal track in one of the upper and lower border of an adjacent track bundle.

2. The method according to claim 1 including the step of reading said special tracks associated with a first of said track bundles using tracking information contained in said special tracks in order to position said recording head, by means of a tracking device, in a position to record on the information medium without recording on said first track bundle and while recording on a second of said track bundles.

3. The method according to claim 1 comprising the further step of reading said information medium at a first speed and fast searching said information recording medium at a second speed and wherein said special tracks contain additional information which is readable when a reading head and said information medium are moved relative to each other at each of said first and second speeds.

4. The method according to claim 1 further comprising the steps of recording said special tracks substantially at said lower lateral borders.

5. The method according to claim 1 wherein said step of recording special tracks includes the step of recording four special tracks with two of said special tracks being inner tracks and two of said special tracks being outer tracks with the inner tracks lying between the outer tracks and wherein information is recorded on said inner and outer tracks by providing characteristics to respectively each of a plurality of surface areas in the outer and inner tracks with the first characteristic being attributed to a total surface area in the outer track and the first and a second characteristic being alternately attributed to said surface areas which form a longitudinal sequence in each of said inner tracks whereby contiguous surface areas in both inner tracks have different characteristics.

6. The method according to claim 5 wherein each surface area of said inner tracks has a predetermined size.

7. The method according to claim 1 wherein the step of recording said special tracks includes the step of recording four tracks which include two inner tracks and two outer tracks with the inner tracks being positioned between the outer tracks and wherein tracking information is represented on said four tracks by attributing characteristics to each of a plurality of surface areas in said outer and inner tracks with a first and a second characteristic being alternately attributed to surface areas which form a longitudinal sequence in each inner and outer track so that surface areas in one inner track are contiguous to surface areas having a same characteristic in the other inner track and wherein surface areas in an inner track are contiguous to a surface area having a different characteristic in an outer track.

8. The method according to claim 6 wherein each surface area in the inner and outer tracks have a predetermined size.

9. An information storage medium for carrying a plurality of longitudinal track bundles on a surface, comprising:
   an upper and a lower lateral border for each of said track bundles wherein said track bundles comprise a plurality of adjacent parallel tracks and wherein said track bundles are parallel to each other; and
   a plurality of special tracks, located in one of said upper and lower lateral borders of each of said track bundles, said plurality of special tracks containing bundle tracking information wherein each of said special tracks is contiguous with at least one other one of said special tracks and wherein track bundle location information for any one track bundle is located in the special tracks in one of the upper and lower border of an adjacent track bundle.

10. An information storage medium according to claim 9 wherein one of said special tracks is contiguous with a lateral border of one of said track bundles.

11. An information medium according to claim 9 wherein said special tracks have surface areas presenting one of at least a first, a second and third characteristic and wherein said surface areas form patterns with said patterns being used to code said tracking information.

12. An information bundle according to claim 11 wherein, for each of said track bundles, said special tracks comprise two contiguous inner tracks between two outer tracks.

13. An information recording medium according to claim 12 wherein said outer tracks have a total surface area having a first characteristic and wherein said inner tracks each have inner surface areas presenting said first or a second characteristic and wherein said inner surface areas form, in each inner track, longitudinally alternating sequences of surface areas presenting said first or second characteristic such that contiguous surface areas in both inner tracks present different characteristics.

14. An information medium according to claim 13 wherein one of said inner tracks has surface areas presenting said second characteristic replaced by surface areas presenting a third characteristic.

15. An information medium according to claim 13 wherein, each inner surface area has a predetermined same size.

16. An information recording medium according to claim 12 wherein said outer and inner tracks have tracking surface areas presenting respectively a first or second characteristic and wherein said tracking surface areas form, in each inner and outer track, longitudinally alternating sequences of surface areas presenting said first or second characteristic whereby any tracking surface area in one inner track is contiguous to a tracking surface area presenting the same characteristic in the other inner track and wherein contiguous surface areas between said outer and inner tracks present different characteristics.

17. An information recording medium according to claim 16 wherein each tracking surface area has the same predetermined size.

18. An information recording medium according to claim 5 wherein said surface areas contain additional information.

* * * * *

UNITED STATES PATENT AND TRADEMARK OFFICE
CERTIFICATE OF CORRECTION

PATENT NO. : 5,917,671

DATED : June 29, 1999

INVENTOR(S): Juergen KAADEN, et al.

It is certified that an error appears in the above-identified patent and that said Letters Patent is hereby corrected as shown below:

On the title page, item [75] the 2nd inventor's city should be:

--Hannover--

On the title page, item [30] is missing. It should be:

--[30]     Foreign Application Priority Data
    Mar. 14, 1996 [DE] Germany ........... 19610089.5--

Signed and Sealed this

Ninth Day of May, 2000

*Attest:*

Q. TODD DICKINSON

*Attesting Officer*      *Director of Patents and Trademarks*